J. RÖTTGEN & J. FREY.
EXPOSURE PLATE FOR COPYING APPARATUS.
APPLICATION FILED JAN. 22, 1908.
899,908.
Patented Sept. 29, 1908.
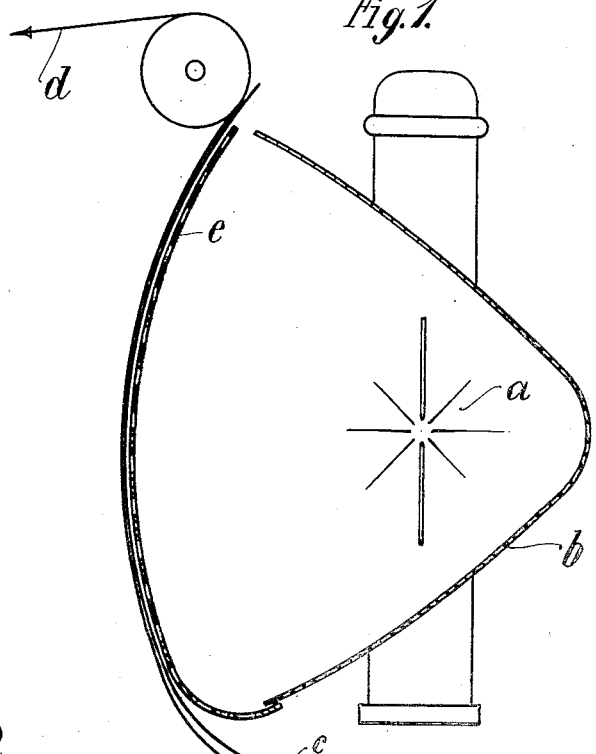
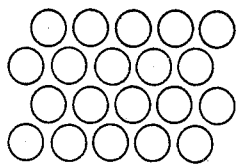
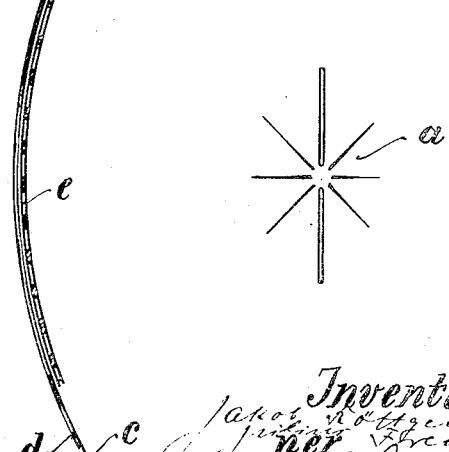
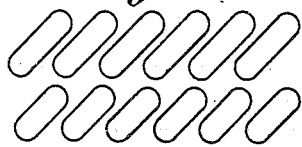

UNITED STATES PATENT OFFICE.

JAKOB RÖTTGEN, OF KLETTENBERG, NEAR COLOGNE, AND JULIUS FREY, OF SÜLZ, NEAR COLOGNE, GERMANY.

EXPOSURE-PLATE FOR COPYING APPARATUS.

No. 899,908.

Specification of Letters Patent.

Patented Sept. 29, 1908.

Application filed January 22, 1908. Serial No. 412,128.

*To all whom it may concern:*

Be it known that we, JAKOB RÖTTGEN and JULIUS FREY, subjects of the Emperor of Germany, residing at Klettenberg, near Cologne-on-the-Rhine, and Sülz, near Cologne-on-the-Rhine, Germany, have invented certain new and useful Improvements in Exposure-Plates for Copying Apparatus, of which the following is an exact, full, and clear specification.

In the apparatus used for preparing light traces ready for use, the exposure is effected by a curved glass plate, behind which both the object to be traced and the strip of paper, which is to be influenced by the light, are passed. The size of these glass plates makes them rather expensive compared with the cost of the whole apparatus; moreover they have various disadvantages, to remove which is the aim of the present invention.

Apart from the fact that a glass plate from its outward influence is of itself liable to be damaged, the intense heating during the process of exposure to light and the cooling on discontinuing the same make it especially liable to crack, for which reason it must be carefully handled. Further a glass disk absorbs a considerable volume of light and easily becomes dimmed when suddenly heated or cooled, so that it is not always ready for use. Finally there is another drawback, viz., that the sheets, which are passed behind it, owing to adhesion are liable to stick, and consequently the object to be traced will probably be pushed against the paper, which is to be operated on by the light. In the case of the present invention however all these disadvantages are avoided by a peculiarly perforated metal plate being employed instead of a glass plate, a strictly novel idea.

In the accompanying drawing, Figure 1 shows one of these metal plates in section, together with the neighboring parts of the whole apparatus, while Figs. 2 to 4 illustrate details of the invention.

In Fig. 1 *a* is the source of light, *b* the reflector, *c* the original tracing to be copied, *d* the paper, which is to be influenced by the light, passed over rollers. The source of light strikes the whole of the bent plate *e*, the peculiar perforation of which is illustrated in two designs in Figs. 2 and 3. In Fig. 2 the holes are punched circular, and it will be noticed that they are arranged alternated in parallel rows. Of course the vents may be made in any other shape than circular, and a vent as per Fig. 3 will be found to be especially advantageous; here the vents are rectangular at about an angle of 45 degrees with the corners rounded off. The spaces between the holes are again alternated in successive rows, so that the whole of the paper may be uniformly influenced by the light. With these bent metal sheets the effect of exposure to light is much more intense than with glass plates, as the effect of the rays on the original tracing is immediate. The enlargement of the vents, which is done of itself during the process of punching, is also favorable for the action of the rays of light. If the plate is placed so that the enlargements are turned to the direction of the paper, then the strong shade effects of the edges will be slightly balanced and a slight vignetting effect will result. With thicker plates this action may be further increased by subsequently enlarging the punched holes. A plate of this kind is shown in Fig. 4 in section.

This invention has the advantages above mentioned compared with a glass plate. The exposure to light is accomplished in a perfectly uniform manner and more intensely; there is no glass to become dimmed and thus prevent the apparatus from being used, and above all the metal plate cannot crack. Finally the polished back prevents the original sheet from sticking at all.

Claims for patent.

1. An exposure plate for copying apparatus composed of metal having holes in rows parallel in one direction, but in a sinuous or zig-zag line in a cross-direction.

2. An exposure plate for copying apparatus composed of metal having elongated holes in rows parallel in one direction but in a sinuous or zig-zag line in a cross-direction.

3. An exposure plate for copying apparatus composed of metal having holes wider in the rear of the plate and tapering to the front in rows parallel in one direction but in a sinuous or zig-zag line in a cross-direction substantially as described and for the purpose set forth.

In testimony whereof we have signed our names to this specification in the presence of two subscribing witnesses.

JAKOB RÖTTGEN.
JULIUS FREY.

Witnesses:
BESSIE F. DUNLAP,
R. H. DUNLAP.